Feb. 23, 1954 W. OBERWERGER 2,670,182
ORNAMENTAL KNOCKDOWN FENCE UNIT
Filed Aug. 9, 1951
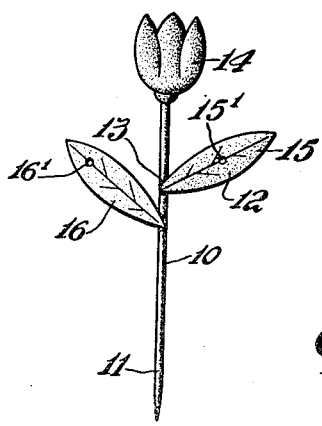
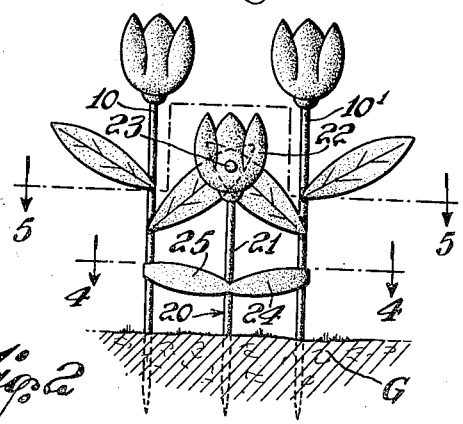
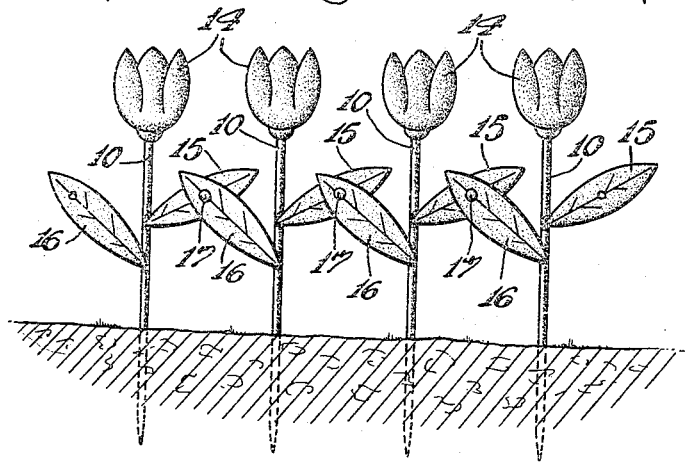
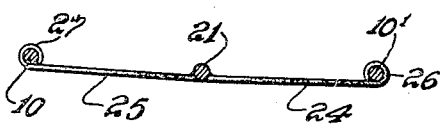
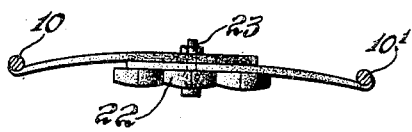
INVENTOR.
William Oberwerger
BY
ATTORNEY Patented Feb. 23, 1954

2,670,182

UNITED STATES PATENT OFFICE 2,670,182

ORNAMENTAL KNOCKDOWN FENCE UNIT

William Oberwerger, Brooklyn, N. Y., assignor to Floral Fence, Inc., Newark, N. J., a corporation of New Jersey Application August 9, 1951, Serial No. 241,072

1 Claim. (Cl. 256—1)

This invention relates to improvements in fence constructions and is directed to the provision of a fence which may be made initially of a number of independent units to be assembled by the ultimate user so as to define a fence of straight, curved or other outline. The fence units are so designed that they may be readily and conveniently secured together and will compensate for any deviations in alignment. Other features and advantages of the invention will become apparent from the description below and the accompanying drawing.

In the drawing:

Fig. 1 is an elevational view of a knock down fence unit embodying my invention, Fig. 2 is a similar view of a number of such units positioned with their stems in close parallel relation, portions of the stems being inserted into the ground, Fig. 3 is a similar view showing another form of the invention wherein a complementary unit is used intermediately adjacent fence units, Fig. 4 is a horizontal sectional view taken on line 4—4 of Fig. 3, and Fig. 5 is a horizontal sectional view taken on line 5—5 of Fig. 3.

As shown in drawings, the ornamental knockdown fence unit of my invention comprises (Fig. 1) an elongated stem 10 having a portion 11 at one end to be inserted into the ground G. A plate 12 is fixed as at one end 13, for example, by spot welding or similar expedients to the stem between the free end of the stem and the inserted end of the stem. The free end of the stem may be in the form of an ornament 14, as, for example, the outline of a flower or the like. The plate 12 has a free end 15 directed laterally of the stem in a given direction; said plate is preferably of ovoidal outline in simulation of the outline of a leaf. A second plate 13 is fixed at one end below the first mentioned plate and directed laterally of the stem in an opposite direction. The plates may be secured to the stem at the same point or preferably, as shown in Fig. 1, at spaced points, said plates being directed upwardly at an acute angle to the longitudinal axis of stem 10, and being so disposed that portions thereof adjacent their free ends will be in the same horizontal plane. Thus, when two or more of said units, with their stems in close parallel position, are inserted into the ground (Fig. 2), their opposed plates will overlap. Said plates are preferably provided with apertures 15', 16' through which bolts 17 may be passed to secure the units together.

The plates are preferably made of bendable material so that they may be secured together equally effectively, for example, in the arrangement shown in Fig. 2, even though some of the stems may be disposed out of alignment with adjacent stems.

As shown in Fig. 3, complementary units 20 may be provided, comprising stems 21 having an exposed height extending only to the plane of the overlapping portions of the plates 12 and 16. Bar members 24, 25 are secured to the stem 21 and provided with curled ends 26, 27 to receive the stems 10, 10'. The free end of stem 21 may have an ornament 22 secured thereto.

In assembling a fence utilizing the complementary units, the latter would first be inserted into the ground and then the stems 10, 10' would be inserted into the free ends of the bar members of the complementary units. Then the overlapping portions of the plates 12, 16 would be secured together and to the stem 21 of the complementary unit by suitable means, as, for example, by bolts 23 passing through the ornaments 22 secured to the stem 21 and through the overlapping portions of the plates 12, 16. It will be understood that the specific outline of the ornaments 14, 22 may be in simulation of a flower or in the form of initials or other ornamental representation, and that suitable, and, if desired, contrasting coloring may be applied to the parts described. The fence will blend in with lawns and other garden appurtenances, providing a highly utilitarian as well as ornamental arrangement.

It will be appreciated that the units may be manufactured, shipped and sold in knocked down condition and assembled by the user in such arrangement as he deems best suited to his specific requirements.

Having thus described my invention, what I claim as new and desire to secure by Letters Patent, is:

In an ornamental fence construction, a plurality of spaced vertical units, each comprising an elongated stem having an ornamental head on its upper end, the lower end adapted to be inserted in the ground, plate-like members extending laterally from the intermediate portion of each stem in opposite directions, the plate-like member on one side of one stem being disposed in overlapping relation with respect to the adjacent plate-like member on the next adjacent stem, means for securing the overlapping portions of the plate-like members together, a complementary unit positioned between a pair of the first mentioned units and comprising a vertical stem having its lower end adapted to be inserted in the ground, an ornamental head on the upper end of the stem of the complementary unit, said last mentioned stem having an exposed height extending approximately to the plate of the overlapping plate-like members and having its head secured thereto, and a pair of bars secured at their inner ends to the stem of the complementary unit and extending laterally therefrom in opposite directions, the outer ends of said bars being secured to the respective stems of the first mentioned pair of units.

WILLIAM OBERWERGER.

References Cited in the file of this patent

UNITED STATES PATENTS

| Number | Name | Date |
|---|---|---|
| 38,396 | King | May 5, 1863 |
| 931,554 | Andersen | Aug. 17, 1909 |
| 1,902,663 | Phillips | Mar. 21, 1933 |
| 1,958,716 | Roach | May 16, 1934 |
| 2,345,455 | Brumfield | Mar. 28, 1944 |